(12) United States Patent
Benuzzi

(10) Patent No.: US 7,458,302 B2
(45) Date of Patent: Dec. 2, 2008

(54) PANEL TURNING DEVICE

(75) Inventor: Piergiorgio Benuzzi, Bologna (IT)

(73) Assignee: Ciben International S.p.A., Bologna (IT)

( * ) Notice: Subject to any disclaimer, the term of this patent is extended or adjusted under 35 U.S.C. 154(b) by 0 days.

(21) Appl. No.: 10/915,207

(22) Filed: Aug. 10, 2004

(65) Prior Publication Data
US 2005/0092157 A1    May 5, 2005

(30) Foreign Application Priority Data
Oct. 31, 2003    (IT)    .................... BO2003A0645

(51) Int. Cl.
*B26D 7/06* (2006.01)
(52) U.S. Cl. .............. 83/733; 83/206; 83/277; 83/767; 83/708
(58) Field of Classification Search ............ 83/277, 83/733, 767, 92.1, 91, 452, 35–36, 56, 708, 83/713, 706, 219, 404.2, 404.3, 404.4, 436.15, 83/436.2, 436.4; 198/400, 413, 414, 411; 414/758, 744, 778, 779, 780; 269/289 MR
See application file for complete search history.

(56) References Cited

U.S. PATENT DOCUMENTS

| | | | | |
|---|---|---|---|---|
| 4,181,054 A * | 1/1980 | Striebig | ........................ | 83/153 |
| 4,381,686 A * | 5/1983 | Ess | ............................ | 83/104 |
| 4,392,401 A * | 7/1983 | Ess | ............................ | 83/219 |
| 4,533,033 A * | 8/1985 | van Wegen | ............... | 198/413 |
| 4,576,536 A * | 3/1986 | Benuzzi | ..................... | 414/790 |
| 4,694,871 A * | 9/1987 | Jenkner | ..................... | 144/35.1 |
| 4,986,726 A * | 1/1991 | Benuzzi et al. | ......... | 414/789.1 |
| 5,458,226 A * | 10/1995 | Nakao et al. | ............. | 198/379 |
| 5,873,922 A * | 2/1999 | Lisec | ......................... | 65/112 |
| 6,470,780 B1 * | 10/2002 | Benuzzi | ..................... | 83/733 |
| 6,536,499 B2 * | 3/2003 | Voorhees et al. | ......... | 156/538 |
| 6,546,834 B1 * | 4/2003 | Benuzzi | ..................... | 83/36 |
| 6,571,674 B2 * | 6/2003 | Benuzzi | ..................... | 83/733 |
| 6,860,800 B1 * | 3/2005 | Maurer | ..................... | 451/364 |
| 2001/0017045 A1 * | 8/2001 | Mattio et al. | .............. | 65/174 |

FOREIGN PATENT DOCUMENTS

| | | |
|---|---|---|
| EP | 0 470 482 A1 | 2/1992 |
| EP | 1 057 599 A2 | 12/2000 |
| EP | 1 138 455 A2 | 10/2001 |
| WO | WO 99/33600 | 7/1999 |

* cited by examiner

*Primary Examiner*—Boyer D. Ashley
*Assistant Examiner*—Laura M. Lee
(74) *Attorney, Agent, or Firm*—Fay Sharpe LLP

(57) ABSTRACT

A panel (2) turning device (1) applicable to a panel saw machine (4) comprises a panel (2) hold-down element (11) located in the vicinity of a lateral edge (5a) of the worktable (5) and acting on the panel (2) in such a way as to form a pivot (12) and an axis of rotation (R) in a defined area of the panel (2). The device (1) also comprises rubber wheels (15) built into the worktable (5), designed to enable the panel (2) to be turned about the pivot (12) and mobile between a rest position in which they are not in contact with the panel (2) and a working position in which they are in contact with the panel (2).

17 Claims, 7 Drawing Sheets

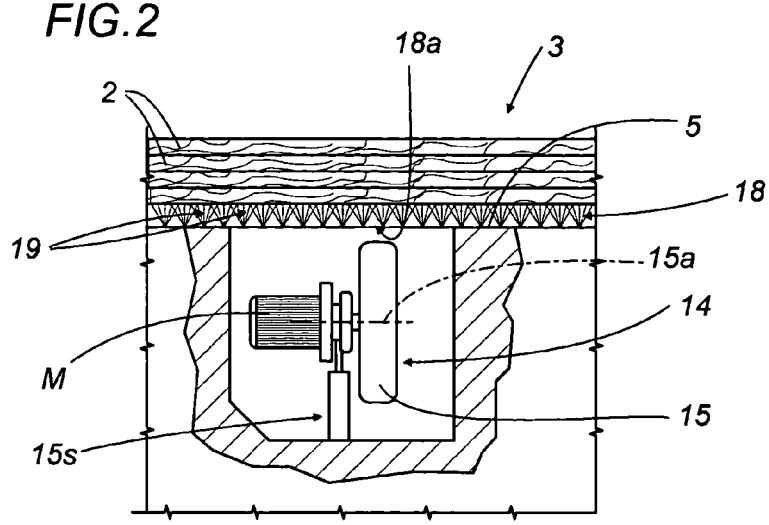
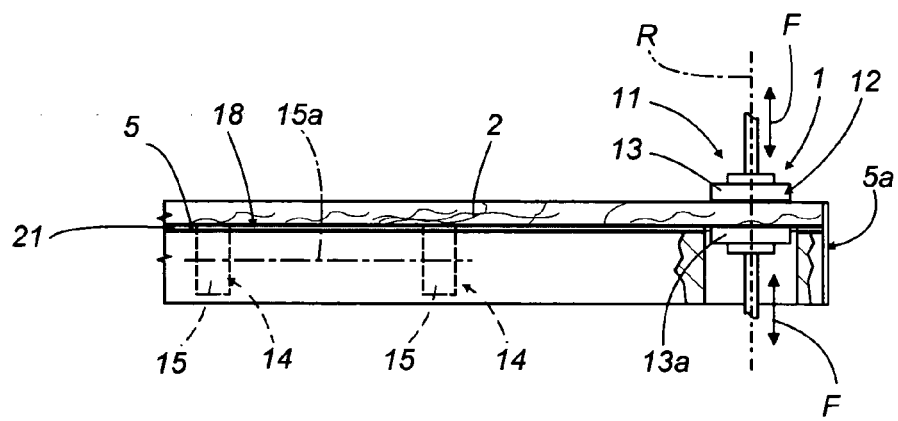
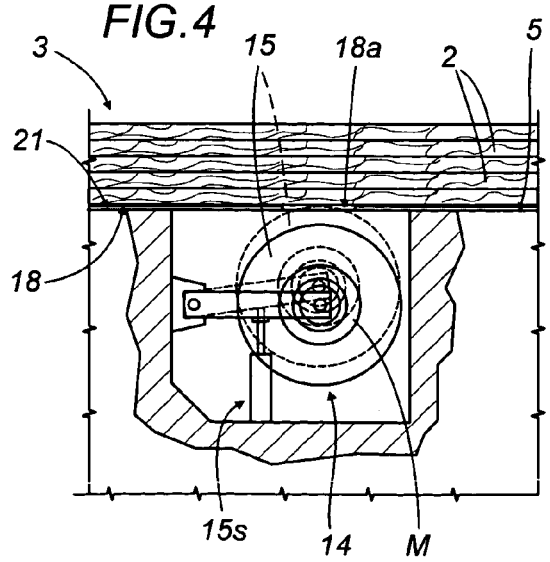

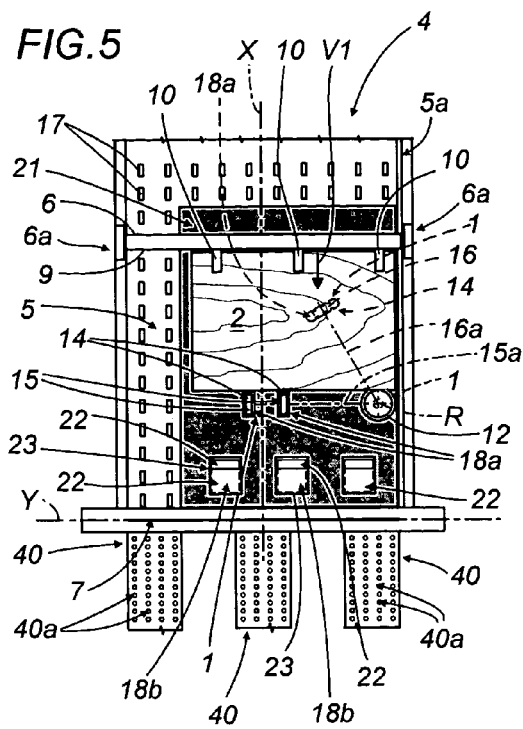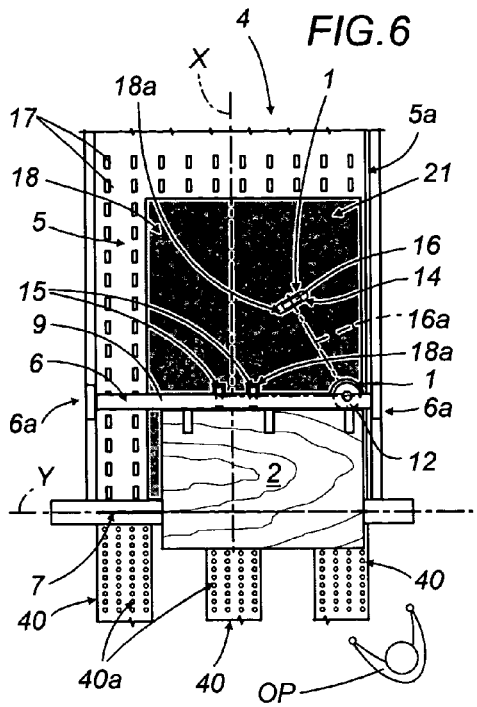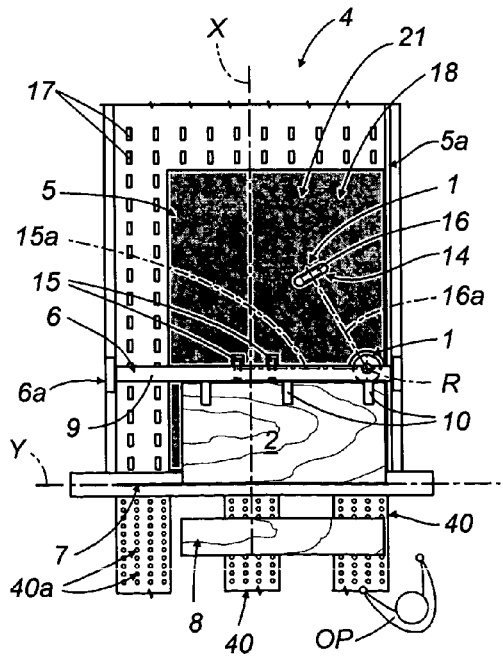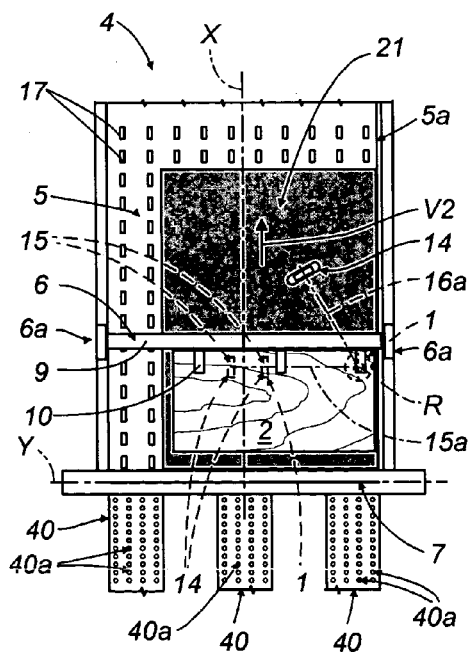

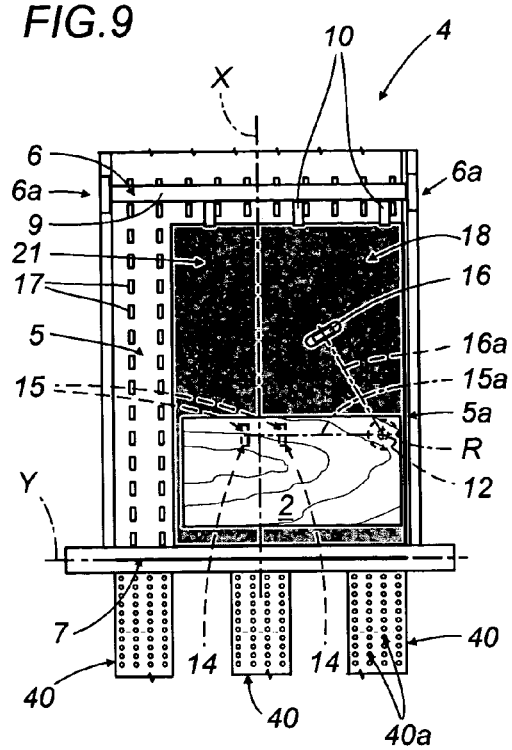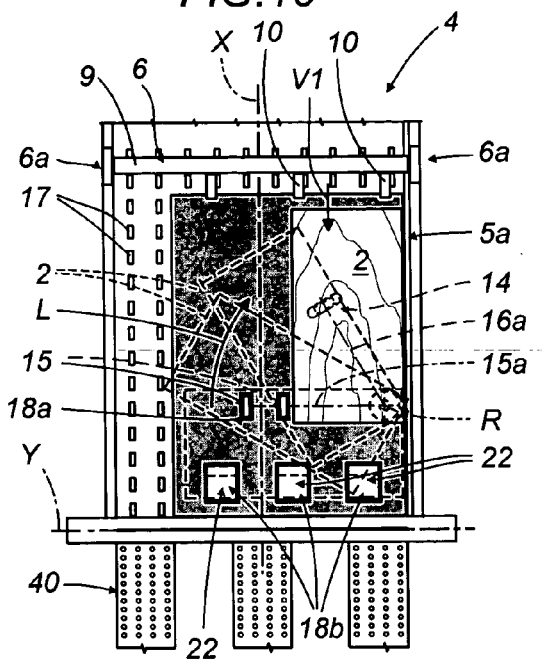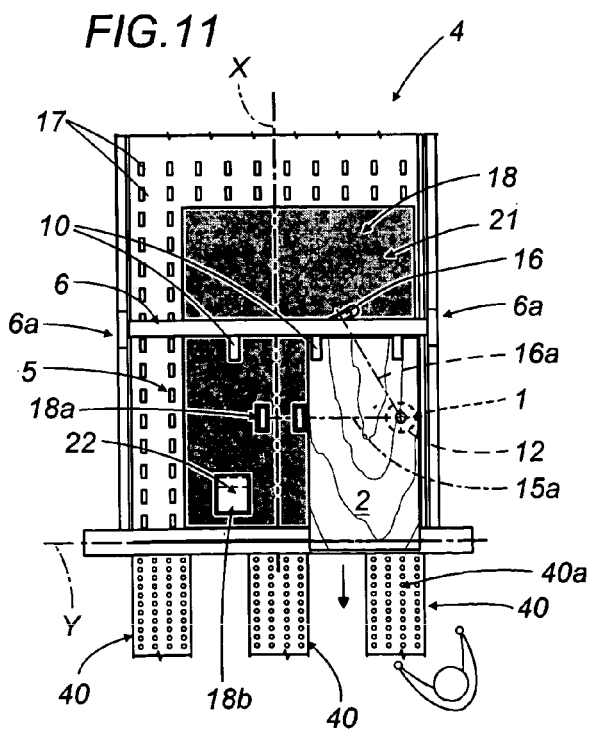

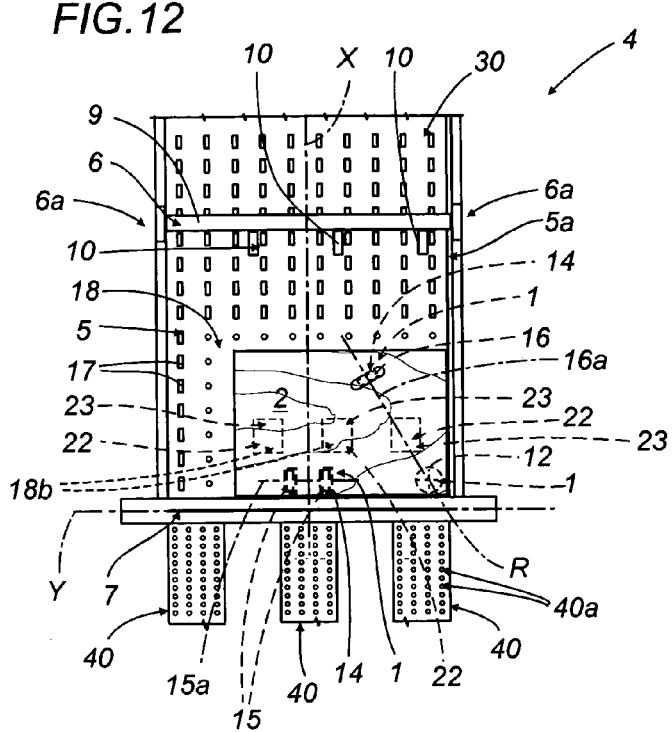
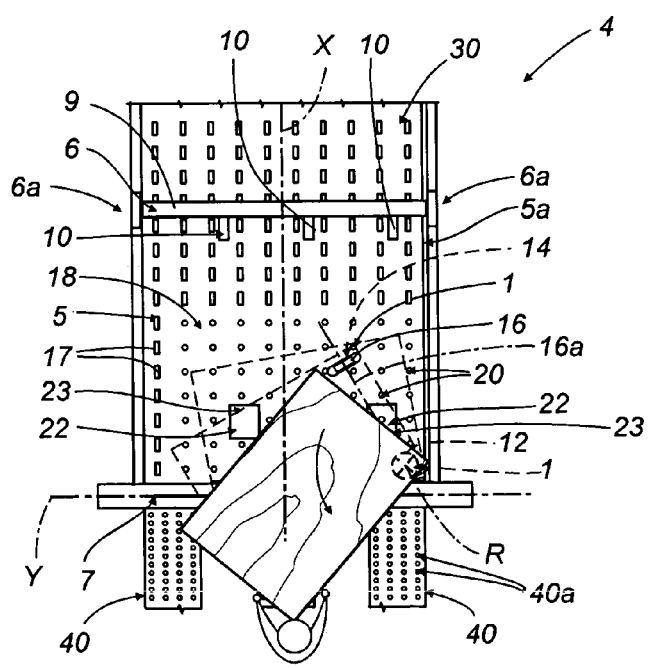

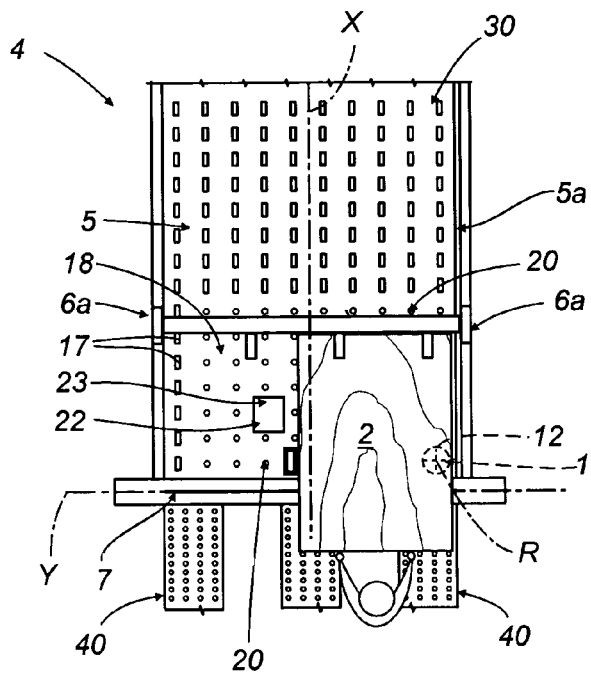
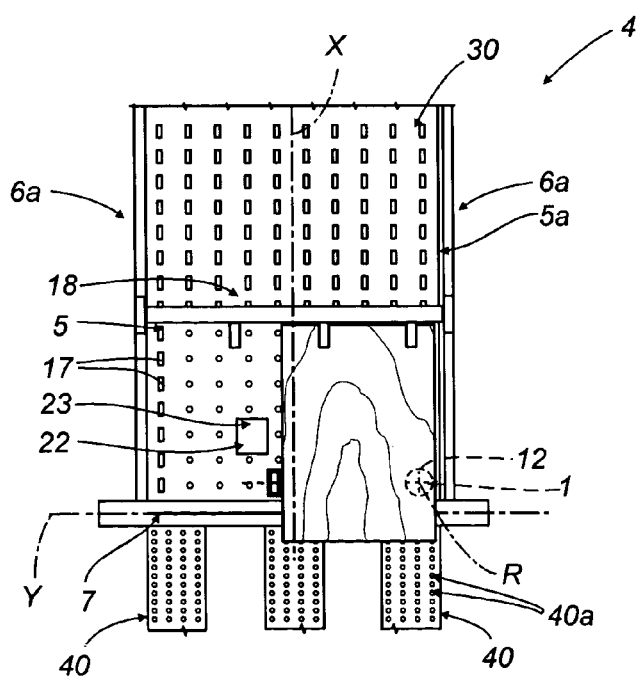

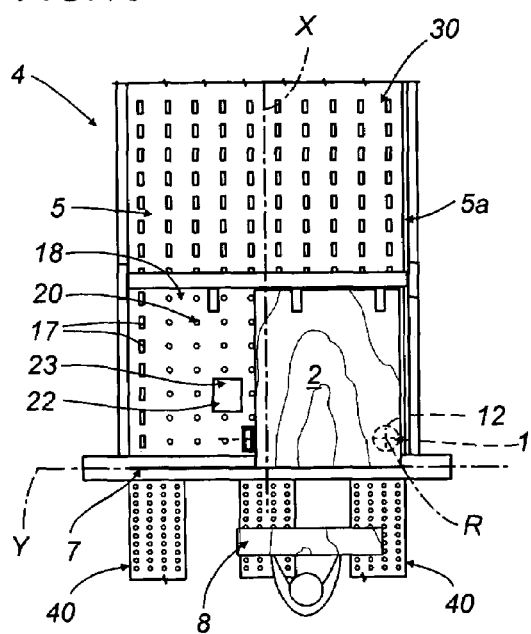
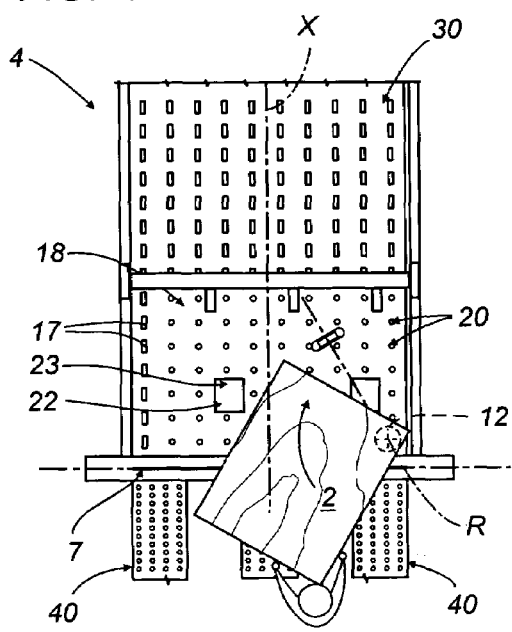
FIG.16
FIG.17
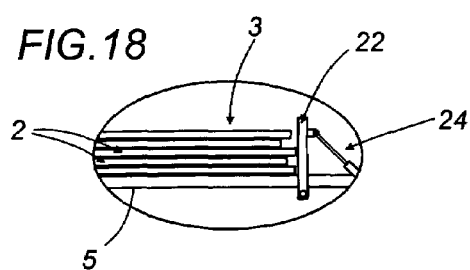
FIG.18
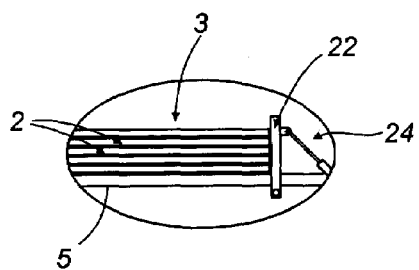
FIG.19
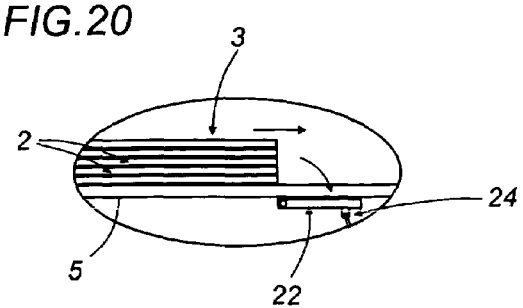
FIG.20

PANEL TURNING DEVICE

BACKGROUND OF THE INVENTION

The present invention relates to a device for turning panels, especially for turning wooden panels on panel saw machines.

Panel saw machines of known type are used to cut panels that vary both in width and length, usually placed one over the other in normally large stacks whose dimensions depend on the size of the panels made by the panel forming machines.

Panel saw machines, in their minimum standard configurations with a single cutting line to which we shall refer in this specification, basically comprise: a horizontal worktable to support the stacks of panels to be cut; a unit for picking up the panels and feeding them, along an axis X (horizontal), towards the end of the table opposite the stack loading end; a cutting device operative on the part of the panel stack at the end where the supporting table is located.

More specifically, the pickup unit comprises a beam equipped with a plurality of pickup elements, for example of the gripper type, located side by side in a direction Y at right angles to the direction of forward or backward feed. The pickup elements act on the rear edge of the panels to be cut and may carry and/or hold the panels in position while they are being cut or moved backwards and forwards on the worktable.

The cutting device is mounted on a carriage that moves in both directions along the axis Y transversal to the panel feed axis X so as to cut right through all the panels if these are stacked or through only one if a single panel is being processed.

Usually, after the panels have been fed to the cutting line, they are trimmed and then, when necessary, cut one or more times according to a predetermined pattern.

After the feeding step, if the panels have to be cut first along a direction parallel to the feed direction corresponding to the axis X, the panel stack or the single panel has to be turned through a right angle so that it can be fed to the cutting device in a position appropriate for the programmed pattern.

To facilitate the work of the operators who have to turn the panels downstream of the cutting device, devices such as the one described in patent EP-1057599 have been devised. These devices basically comprise an element for holding down at least one panel being processed and means for turning the panel about the hold-down element.

More specifically, the hold-down element is located in the vicinity of the worktable in such a way as to form a pivot in a preset area of the panel and the means for turning the panel about the pivot facilitate panel movement to change the position of the panel relative to the cutting device.

These turning devices, however, have a complex structure including numerous components such as pusher elements associated with the pickup units.

On account of their complexity, the cost of these devices and hence of the machines they are mounted on tend to be quite high.

In particular, when the panel turning means operate in combination with the pickup units, the latter have to be mobile at least transversely along the aforementioned beam, which means that additional components and technology are required, thus further increasing costs.

Prior art turning devices also include rotating platform type devices consisting of a large turntable located in the middle of the worktable and designed to turn the panels positioned on it. On account of their size and position, however, devices of this kind make further processing of the panels impossible since no room is left on the panel saw machine to cut the sub-panels transversely again.

In particular, since the turntable with the stack of panels on it is located in the middle of the worktable, it is impossible for the operator to move the sub-panels back onto the worktable from downstream of the cutting device since there is not enough room on the worktable itself. Furthermore, panels may be stacked on the turntable but are not secured to each other, with the risk of the stack falling apart.

SUMMARY OF THE INVENTION

The present invention therefore has for an object to overcome the aforementioned disadvantages by providing a panel turning device for panel saw machines that has a simple, economical structure.

Another object of the invention is to provide a panel turning device whose basic components do not occupy the worktable when they are not being used.

Yet another object of the invention is to provide a panel turning device for panel saw machines that does not obstruct the work of machine operators, leaves sufficient room on the worktable for further cutting and trimming of the sub-panels and allows a stack of panels to be turned without the risk of upsetting the stack itself.

The technical characteristics of the invention according to the aforementioned objects may be easily inferred from the contents of the appended claims, especially claim 1, and preferably any of the claims that depend, either directly or indirectly, on claim 1.

BRIEF DESCRIPTION OF THE DRAWINGS

The advantages of the invention are apparent from the detailed description which follows, with reference to the accompanying drawings which illustrate a preferred embodiment of the invention provided merely by way of example without restricting the scope of the inventive concept, and in which:

FIG. 2 is a front view, with some parts in cross section in order to better illustrate others, of a detail of the device according to the invention;

FIG. 3 is a front view, with some parts in cross section in order to better illustrate others, of another detail of the device according to the invention;

FIG. 4 is a side view of the detail of FIG. 2, with some parts in cross section for greater clarity.

FIGS. 5 to 11 illustrate a generic sequence of operations for positioning, cutting and turning the panels that can be performed with the device according to the invention, all the figures showing the components in schematic top views on a different scale from that of FIG. 1 solely for simplicity of illustration;

FIGS. 12 to 17 illustrate a generic sequence of operations for positioning, cutting and turning the panels that can be performed with another embodiment of the device according to the invention;

FIGS. 18, 19 and 20 are schematic side views, with some parts cut away for clarity, of a succession of steps for aligning the panels in the machine of FIG. 1.

DESCRIPTION OF THE PREFERRED EMBODIMENTS

Figure 1:
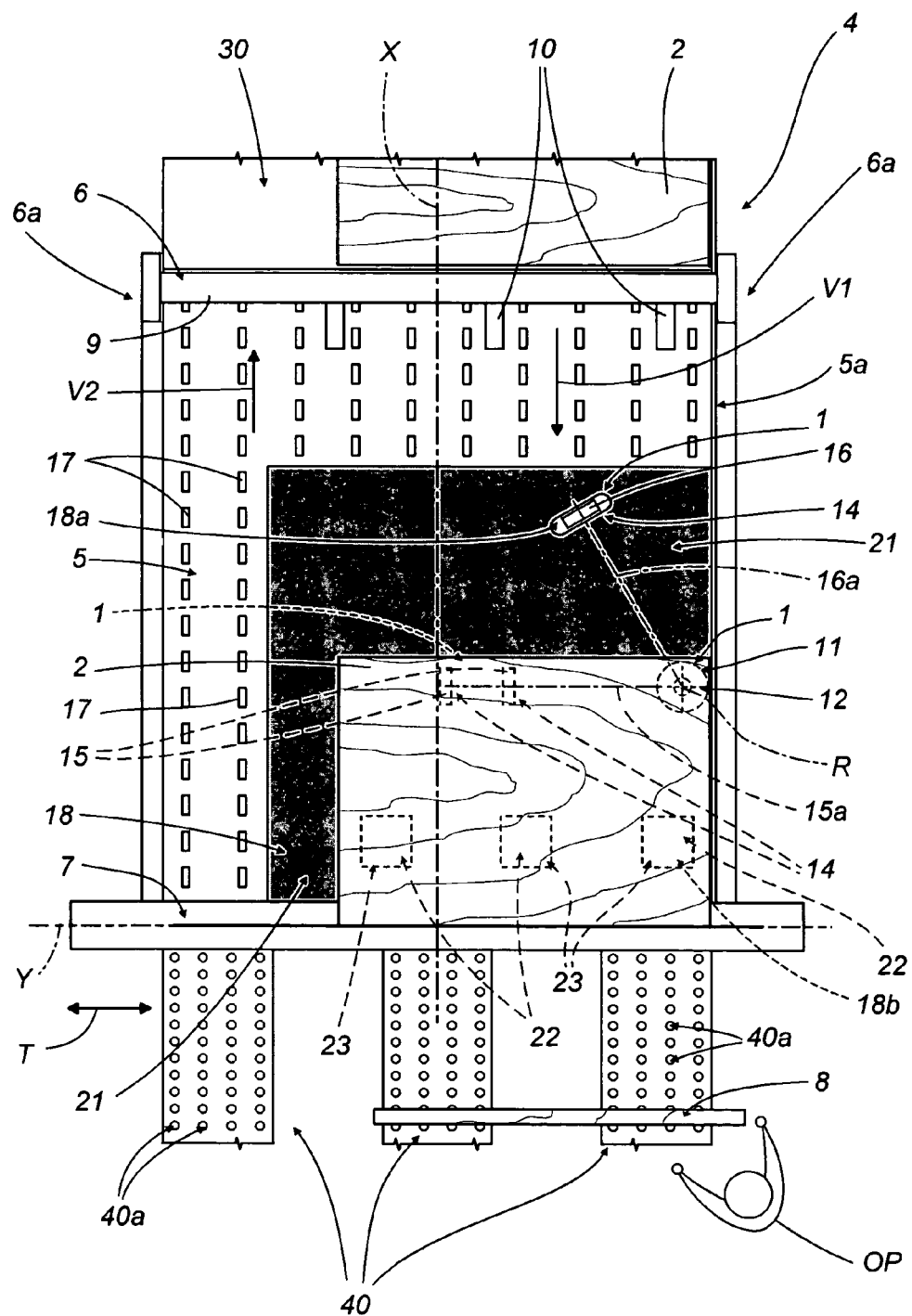
FIG. 1 is a schematic plan view of a panel saw machine equipped with a preferred embodiment of the panel turning device according to the invention.

With reference to the accompanying drawings, especially FIG. 1, the numeral 1 denotes in its entirety a device for turning panels 2.

For simplicity, the description that follows will refer to a panel 2 to also include two or more panels 2 placed one over the other to form a stack 3 of panels 2, as illustrated in FIGS. 2, 4, 18, 19 and 20, it being more common for panel saw machines to be required to process stacks 3.

The panel 2 turning device 1 is designed to be applied to a panel saw machine 4 comprising, in its basic configuration with a single cutting line, the following components:

- a horizontal worktable 5 for supporting and conveying the panel 2, defined laterally by an edge 5a used as the zero line for the entire machine cycle;
- a transporting element 6 that moves along a feed line X forwards in a direction V1 and backwards in a direction V2 in such a way as to push the panel 2 on the horizontal worktable 5;
- a cutting device 7—of known type and therefore not described in detail or illustrated in the accompanying drawings—in a solution with a single bottom tool, that moves in the two directions indicated by the arrow T and divides the panel 2 into smaller sub-panels 8, illustrated in FIGS. 7 and 16, by sawing the panel 2 in a direction Y that is substantially perpendicular to the feed line X;
- an outfeed table 40 (of the type with two or more elements set apart to allow the passage of an operator OP) on which the sub-panels 8 can be handled and positioned by the operator OP as described below; according to known embodiments of it, the table 40 is equipped with a plurality of air cushion elements 40a to facilitate handling of the panels 2; in other embodiments that are not illustrated, the table 40 is not necessarily equipped with the air cushion elements 40a;
- a loading table or station 30, schematically illustrated in FIG. 1 and not described in detail, located upstream of the components listed above in the forward direction of feed V1.

The aforementioned element 6 comprises a crossbar 9 equipped with at least one pickup element 10 mobile (preferably) on the crossbar 9 itself along an axis parallel to the axis Y and designed to grip the panel 2 by an area at the back of relative to the forward direction of feed V1 in such a way as to hold it securely while it is being cut or positioned on the worktable 5; the element 6 also comprises drive means 6a which are not further described since they are of substantially known type.

The pickup elements 10, in configurations that are not illustrated, are variable in number according to requirements and may move in multiple directions even along an axis perpendicular to X and Y in a manner that is well known and therefore not described.

As illustrated in particular in FIG. 3, the panel 2 turning device 1 basically comprises a panel 2 hold-down element 11 that forms a pivot 12, with an axis of rotation R, in a defined area of the panel 2.

The element 11 basically comprises a first plate 13 and a second plate 13a facing each other on opposite sides of the panel 2, and both are mobile vertically as indicated by the arrow F, according to known methods which are not further described.

More specifically, as shown for example in FIG. 1, the hold-down element 11 of the device 1 according to the present invention is located in the vicinity of the lateral edge 5a of the worktable 5 upstream of the cutting device 7 relative to the forward direction of feed V1 of the mobile element.

As illustrated in all the drawings, the device 1 also comprises positioning means 14 for turning the panel 2 about the pivot 12 in such a way as to vary the position of the panel 2 relative to the cutting device 7 according to the method described below.

More specifically, the positioning means 14 are built into the worktable 5 upstream of the cutting device 7 relative to the forward feed direction V1 and, as illustrated in FIG. 4, are mobile between a rest position, where they lie under the worktable 5, and a working position, drawn with a dashed line, where they lie at least partially above the worktable 5.

The positioning means 14 are normally driven from one position to the other by customary means, which are not described in detail, such as a lifting unit 15s that is schematically illustrated in FIGS. 2 and 4.

More specifically, the means 14 each consist of a roller or rubber wheel 15 having a principal axis 15a that is substantially parallel to the axis Y. The means 14 are power driven by customary means such as, for example, a motor M acting directly on the wheel 15 to turn it about the axis 15a.

With reference in particular to FIGS. 1, 5, 6, 7, 8, 9, 10, 11, 12 and 13, the means 14 also comprise another wheel 16, having an axis 16a and mounted with the axis 16a at an angle relative to the axes X and Y at an intermediate position between the wheels 15 and the edge 5a with reference to a line L of rotation of the panel 2.

In the preferred embodiment illustrated by way of example, the axes 15a and 16a intersect the axis of rotation R, that is to say, the wheels 15 and 16 are positioned radially relative to the axis of rotation R in such a way as to optimize the efficiency of the device 1.

Advantageously, the device 1 may comprise a plurality of transporting elements such as the wheels 15 and 16, designed to guarantee the operation of the device 1 according to the size and constructional architecture of the machine 4 and according to the size of the panels 2 to be handled.

Usually, whatever the type of transporting element used, this has a substantially cylindrical transporting surface and is covered with a suitable material, for example rubber, in order to increase friction between its lateral surface and the panel 2 to be moved.

Usually, in almost all panel saw machines 4, the panel 2 worktable 5 comprises a plurality of idle conveyor rollers 17 that turn about axes of rotation normal to the feed line X to facilitate movement of the panel 2 along the feed line X.

At the worktable 5 and at the panel 2 positioning means 14, the panel 2 turning device 1 comprises a multiplicity of multidirectional low-friction supporting members which form a multidirectional surface 18 on which the panel 2 is turned. Obviously, the surface 18 presents openings 18a allowing the passage of the rubber wheels 15 and 16.

It is important to observe that the surface 18 is smaller than the worktable 5 it is set in: this solution makes it possible to maintain a customary system of moving the panel using the rollers 17 constituting a common, low-cost unidirectional conveying system, thus reducing the use of multidirectional supporting members which permit facilitated movement of the panel 2 only at a restricted (but necessary) surface in the vicinity of the pivot 12.

Looking in more detail, the supporting members may comprise brush type elements 19, shown in FIG. 2 or air cushion devices 20, illustrated schematically in FIGS. 12 to 17, or elements 21 made of fibrous material with a low adherence coefficient (moquette) illustrated in simplified form in FIG. 1 and in FIGS. 3 to 11. In other words, the supporting members may comprise any suitable type of element that permits multidirectional mobility of the panel 2.

The choice of the elements 19 to 21 will depend on the type of material the panel 2 is made of and on the overall cost of the investment to be borne.

Upstream of the cutting device 7 relative to the forward feed direction V1, there are stop elements 22 that are mobile between a rest position, where they lie under the worktable 5, as illustrated schematically in FIG. 1 and FIGS. 6 to 17, and a working position, where they lie above the worktable 5, as shown schematically in FIG. 5 and in FIGS. 18 and 19.

Looking in more detail, with reference to FIGS. 18 and 19, the stop elements 22, which define aligning means 23, are mounted in such a way as to move between a working position, where they intercept a stack 3 of panels 2 as it is fed towards the cutting device 7 thus aligning the panels 2 in the stack 3, and a rest position, illustrated in FIG. 20, where they are accommodated in a suitable space made in the worktable 5, the surface 18 having openings 18b made in it to permit their passage. In FIG. 18, the misalignment of the panels 2 is emphasized in order to better illustrate the operation of the aligning means 23.

The stop elements 22 are driven by customary mechanical devices such as, for example, pneumatic pistons 24.

During use, the panel 2 is picked up in a substantially known manner from the loading station 30 and positioned on the worktable 5.

With reference in particular to FIGS. 5 to 11, the transporting element 6 grips the panel 2 by means of the pickup elements 10 and moves it along the lateral edge 5a towards the cutting device 7 which performs a first cutting pass.

Looking in more detail at FIGS. 18, 19 and 20, in the case of a stack 3 of panels 2, once the panels 2 have been placed on the worktable 5 and before they are gripped by the pickup elements 10 and cut, the transporting element 6 pushes the panels 2 against the stop elements 22. The elements 22 oppose the motion of the stack 3, thereby lining up the panels exactly one over the other by pushing them in the forward feed direction V1 upstream of the crossbeam 9 and downstream of the elements 22.

Once the panels 2 have been aligned with each other, the pickup elements 10 grip the panels 2 and the stop elements 22 move back to the rest position, driven by the pneumatic pistons 24, as shown in FIG. 20, or, in other embodiments which are not illustrated, by other suitable customary means which cause them to move under the worktable 5.

The transporting element 6 then pushes the stack 3 up to the cutting device 7 which operates in the same way as described above for a single panel 2.

After the first cutting operation, the remaining portion of the panel 2 or stack 3 (which, for convenience, we shall continue to refer to as panel 2) may be rotated by the device 1.

With reference in particular to FIG. 8, the panel 2, held by the transporting element 6, is positioned against the edge 5a in the vicinity of the hold-down element 11 in such a way that it can be turned.

As shown in FIG. 1, the panel 2 may be ready to be turned without having to be moved further by the element 6 after the first cutting operation, that is to say, the hold-down element 11 is already in the vicinity of a corner of the panel 2, as explained in more detail below.

The hold-down element 11 forms the pivot 12 and the axis of rotation R in the predetermined area of the panel 2 by moving the plates 13 and 13a to the panel 2 at a corner of the panel 2.

As illustrated schematically in FIGS. 8, 9 and 10, the hold down element 11 and, consequently, the wheels 15 and 16, forms the pivot 12 at a point corresponding substantially to the corner of the panel 2 positioned against the edge 5a upstream relative to the forward feed direction V1.

In this configuration, it is possible to start turning the panel 2 clockwise by a first step, illustrated by the dashed line in FIG. 10.

As illustrated in FIGS. 12 to 17, the panel 2, after the first cut, may be positioned relative to the hold down element 11 in such a way that the pivot 12 is at the downstream corner of the panel 2 relative to the forward feed direction V1. In this case, the first rotation of the panel 2, illustrated by the dashed line in FIG. 13, can be performed easily in a counterclockwise direction once the pivot 12 has been formed in a manner similar to that described above. During this rotation, the operator OP may accompany the panel 2 as it moves past the cutting device 7.

As illustrated in FIGS. 14 and 15, once the panels 2 in the stack 3 have been turned, the operator may push them against the transporting element 6 so they are lined up one over the other, after which the transporting element 6 itself repositions them relative to the cutting device 7.

Further, in the preferred, non-restricting embodiment illustrated, the hold down element 11 is mounted in the vicinity of the cutting device 7. As shown in FIG. 17, if the panel 2 extending onto the table 40 needs to be turned clockwise again, the operator OP may push panel 2, thus facilitating the action of the positioning means 14, activated as described below (it should be noticed that in the case of this further clockwise rotation, the panel 2 is positioned by the device 6, or by the operator OP, in such a way that the pivot 12 is at the upstream corner of the panel 2 relative to the forward feed direction V1).

It should also be noticed that in this embodiment, the multidirectional surface 18 may be smaller than the multidirectional surface of the embodiment described above, since the panel 2, as it turns, is also supported by the table 40.

To perform the rotations in both the embodiments described, the positioning means 14, normally at rest, are moved into the working position in contact with the panel 2. In this configuration, the panel 2 is resting on the turning surface 18 and, more specifically, on the low-friction elements 19, 20, 21 described above, held down rotatably at the pivot 12 and substantially pressed down by its own weight on the rubber wheels 15 and 16.

The wheels 15 and 16 start turning about their respective principal axes 15a and 16a and, thanks to the friction between the wheels 15 and 16 and the panel 2 combined with the action of the low-friction turning surface 18 and the pivot 12, the panel 2 is turned.

Advantageously, in both configurations, the means 14 can turn about their axis in both directions, thus turning the panel 2 both clockwise and counterclockwise.

Once the panel 2 has been turned, it is once again gripped by the pickup elements, as shown in FIG. 11, and positioned, relative to the cutting device 7, in such a way that it can be cut in the Y direction and, if necessary, turned again.

In the machines of both the embodiments illustrated, the panel 2 can be turned in both directions one or more times as described above in accordance with process requirements.

A device constructed as described above therefore fully achieves the aforementioned aims thanks to a simple and economical structure that can turn the panel efficiently.

To facilitate the sliding of the panel along the feed line, the worktable 5 consists principally of idle rollers, constituting an extremely economical transporting system, and has more sophisticated, expensive low-friction elements only in a small portion of it where turning is actually carried out.

The turning area is located on one side of the worktable so the rest of the worktable, which is not occupied by the panel, can be used for further processing of the sub-panels resulting from the cutting operations.

The sub-panels can be pushed back onto an unoccupied portion of the worktable for processing by the cuffing device. More specifically, the sub-panels can be fed to the panel saw machine by machine operators at the end opposite the loading station.

The invention described has evident industrial applications and can be subject to modifications and variations without thereby departing from the scope of the inventive concept. Moreover, all the details of the invention may be substituted by technically equivalent elements.

What is claimed is:

1. A panel cutting and turning device comprising:
   a worktable including a surface for supporting an associated panel;
   a transporting element which moves in a forward direction along a feed line and in a backwards direction and adapted to move the associated panel along the worktable surface, said transporting element comprising at least one pickup element adapted to grip the associated panel;
   a cutting device that divides the associated panel into sub-panels by sawing in a direction that is substantially transverse to the feed line;
   a panel hold-down element adapted to selectively contact the associated panel to form a pivot about a vertical pivot axis in a defined area of the associated panel;
   positioning means adapted to turn the associated panel about the pivot to vary the position of the panel on the surface of the worktable, said positioning means comprising first and second power driven wheels adapted for power driven rotation about respective first and second axes of rotation, wherein said first and second axes of rotation are each substantially parallel to the surface of the worktable and wherein said first and second axes of rotation are angled with respect to each other and each intersect the pivot axis;
   wherein said first and second wheels are each selectively movable, independently of each other, from a rest position recessed relative to the surface of the worktable to a working position at least partially projecting outwardly from the surface of the worktable.

2. The device according to claim 1, wherein the positioning means and the hold-down element are located upstream of the cutting device relative to the forward direction.

3. The device according to claim 1, wherein the hold-down element is located in the vicinity of the cutting device.

4. The device according to claim 1, comprising a plurality of low friction supporting elements forming a multidirectional surface associated with the worktable and located in the vicinity of the hold-down element.

5. The device according to claim 1, comprising a plurality of brush type supporting elements forming a multidirectional surface associated with the worktable and located in the vicinity of the hold-down element.

6. The device according to claim 1, comprising a plurality of supporting elements made of fibrous material, forming a multidirectional surface associated with the worktable and located in the vicinity of the hold-down element.

7. The device according to claim 1, comprising a plurality of air cushion elements forming a multidirectional surface, associated with the worktable and located in the vicinity of the hold-down element.

8. The device according to claim 4, wherein the multidirectional surface presents openings allowing the passage of the positioning means.

9. The device according to claim 4, wherein the surface is smaller than the worktable.

10. The device according to claim 1, wherein the first and second wheels are coated with rubber.

11. The device according to claim 4, further comprising aligning means for compacting a stack of the associated panels, the aligning means being mounted in the worktable and being mobile between a rest position in which they lie under the worktable and a working position in which they lie above the worktable,
    wherein the surface presents openings allowing the passage of the aligning means.

12. The device according to claim 11, wherein the aligning means comprise at least one stop element which is located in the vicinity of the cutting device and which, at the working position, intercepts the stack as it moves along the feed line.

13. The device according to claim 5, wherein the multidirectional surface presents openings allowing the passage of the positioning means.

14. The device according to claim 6, wherein the multidirectional surface presents openings allowing the passage of the positioning means.

15. The device according to claim 5, wherein the surface is smaller than the worktable.

16. The device according to claim 6, wherein the surface is smaller than the worktable.

17. The device according to claim 7, wherein the surface is smaller than the worktable.

* * * * *